Jan. 10, 1933.  H. B. MYERS  1,894,190
COIN ASSORTING AND COUNTING MACHINE
Filed Dec. 5, 1930    10 Sheets-Sheet 1

Fig. 1.

Inventor
Herbert B. Myers,
By Townshend & Townshend
Attorney

Jan. 10, 1933.    H. B. MYERS    1,894,190
COIN ASSORTING AND COUNTING MACHINE
Filed Dec. 5, 1930    10 Sheets-Sheet 6

Jan. 10, 1933.   H. B. MYERS   1,894,190
COIN ASSORTING AND COUNTING MACHINE
Filed Dec. 5, 1930    10 Sheets-Sheet 7

Inventor
Herbert B. Myers,
By Townshend & Townshend
Attorney

Jan. 10, 1933.   H. B. MYERS   1,894,190
COIN ASSORTING AND COUNTING MACHINE
Filed Dec. 5, 1930   10 Sheets-Sheet 8

Inventor
Herbert B. Myers,
By Townshend & Townshend
Attorney

Jan. 10, 1933. H. B. MYERS 1,894,190
COIN ASSORTING AND COUNTING MACHINE
Filed Dec. 5, 1930 10 Sheets-Sheet 10

Inventor
Herbert B. Myers,
By Townshend + Townshend
Attorney

Patented Jan. 10, 1933

1,894,190

UNITED STATES PATENT OFFICE

HERBERT B. MYERS, OF LITTLE ROCK, ARKANSAS

COIN ASSORTING AND COUNTING MACHINE

Application filed December 5, 1930. Serial No. 500,370.

This invention relates to apparatus for mechanically assorting, counting, and distributing coins, car tokens, and the like.

An important object of the invention is the provision of a machine by which a large number of mixed coins can be separated, counted and distributed with accuracy and speed, and in which a further assortment of coins of the same denomination may be effected with respect to thickness.

Another object is the provision in such a machine of means whereby initially assorted coins of varied denomination may be counted and distributed either separately or in conjunction with unassorted coins.

A further object is the provision of mechanism of this character which may be employed only to assort mixed coins, without counting.

An additional object is the provision of mechanism of this character which may be employed only to count coins, being selectively adjustable for accommodating various denominations. Other objects will be apparent to those skilled in the art.

This specification and accompanying drawings describe and illustrate, in practical, physical embodiment, the principles of this invention, the disclosure constituting an exposition of the best means I have thus far devised for reducing the invention to practice. It is to be understood that the structural details shown and described do not constitute limitations except within the scope of the inventon as claimed.

In the present disclosure the invention is treated in three physical embodiments, that is, as an assorting and counting machine, as a sorting machine, and as a counting machine. In the drawings:—

Figure 1:
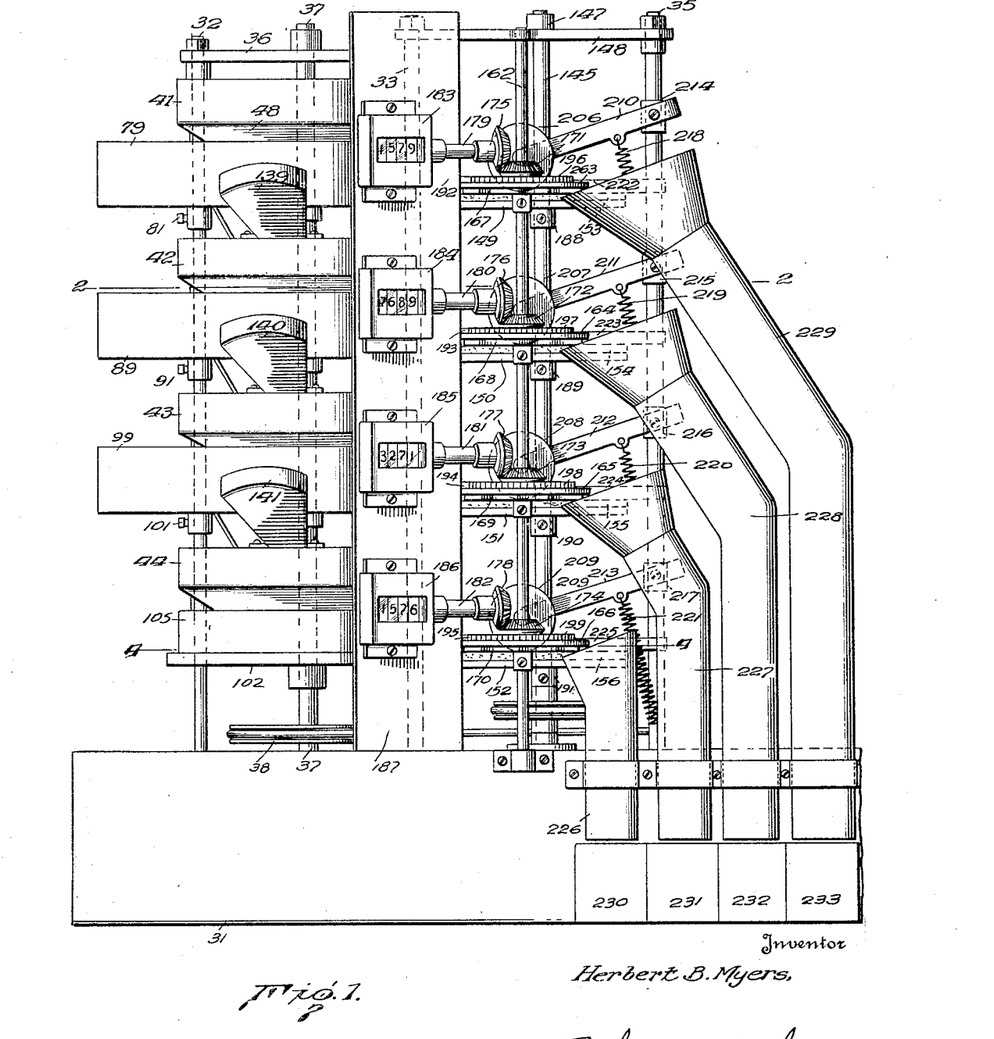
Figure 1 is an elevation of an assorting and counting machine.

In the illustrated embodiment the coin assorting and counting mechanism consists of a base 31 having four rigid upright supporting standards 32, 33, 34 and 35 which are arranged in parallel spaced relation. At the top of the machine, note Figure 1, the upper ends of the standards 32 and 33 carry a cross-bar 36 extending therebetween, which bar intermediate its ends provides a guide bearing for the upper end of a driven shaft 37, the lower end of which is journalled in the base 31. The shaft 37 is disposed midway between and parallel to the standards 32, 33, and has rigidly attached thereto adjacent its lower end a driven pulley 38 adapted to be rotated by means of a driving belt 39 having connection with a drive element on an electric motor 40 suitably mounted on the base 31.

Figure 3:
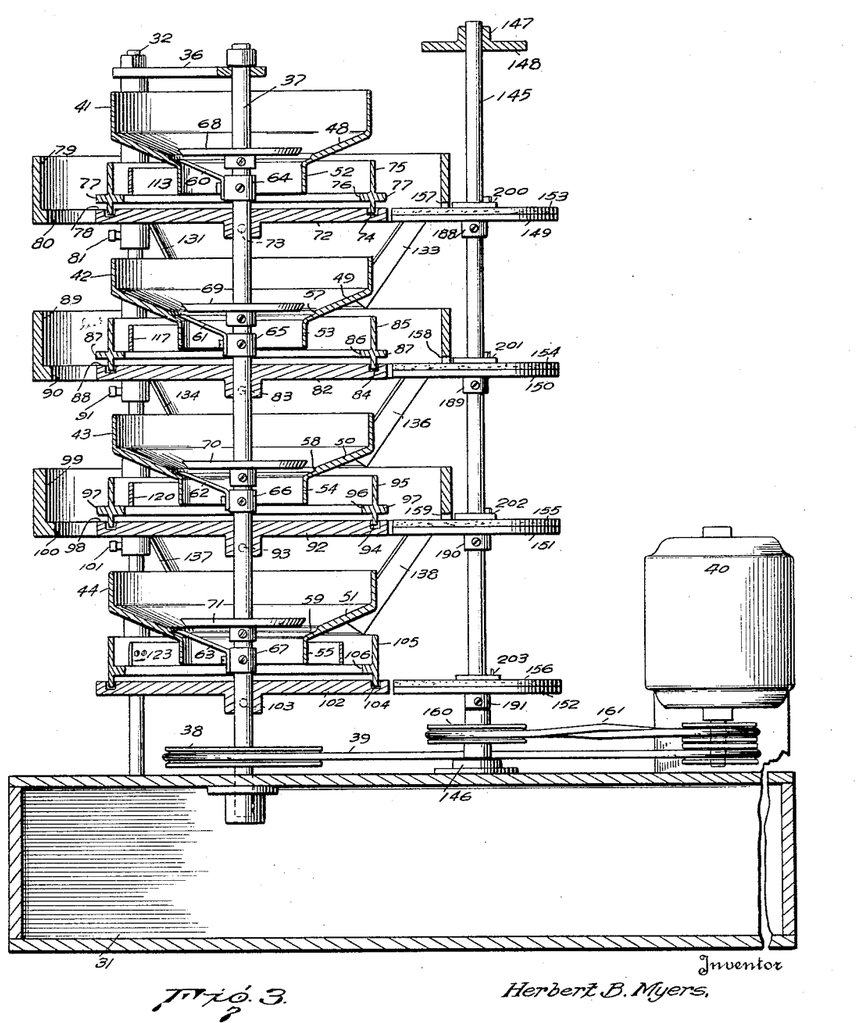
Figure 3 is a vertical section substantially on the line 3—3 of Figure 2.

A plurality of superposed vertically spaced coin receiving hoppers 41, 42, 43 and 44 are rigidly attached to and supported between the standards 32 and 33. The means connecting the hoppers and standards is shown in detail in Figure 6 and consists of radial arms 45 extending from the periphery of the hopper and terminating in sleeves 46 slidable on the adjacent standards and adjustable thereon by means of set screws 47, whereby the hoppers may be raised or lowered as desired. Each of the hoppers has a downwardly inclined bottom, shown at 48, 49, 50 and 51 respectively, see Figure 3, which bottoms terminate in depending cylindrical discharge necks 52, 53, 54 and 55. The hopper bottoms are rabbeted inwardly from the upper edges of their necks to form annular seats 56, 57, 58 and 59 into which extend the ends of inclined agitator arms 60, 61, 62 and 63 rigidly attached to or carried by set screw adjustable sleeves 64, 65, 66 and 67 on the shaft 37 with which they rotate.

Also fixedly secured to the shaft 37 and adjustable vertically thereon by set screws are coin spreader plates 68, 69, 70 and 71, one to each hopper. These plates are circular and are each equal in diameter to the diameter of the hopper neck above which each is spaced a distance sufficient to permit passage of coins. It is obvious that the vertical adjustment of these spreader plates in relation to spacing above the hopper bottoms determines the rate of feed of coins through the hoppers.

Beneath the neck 52 of the uppermost hopper 41 the shaft 37 carries a flat disc 72 which is rotatable with the shaft and is adjustable vertically thereon by means of a set screw 73. The diameter of disc 72 is greater than that of the hopper 41 and adjacent its edge but spaced inwardly therefrom the disc is provided with a circumferential groove 74 within which is received, with a slight all around clearance, the bottom of an inner coin retaining ring 75 supported by and between the standards 32 and 33. The height of the retaining ring is such as to dispose its upper edge in a plane which passes through the inclined bottom of the hopper, thus affording ample space for holding a large number of coins on disc 72.

The ring 75 is provided on its inner face with a continuous lateral annular flange 76 spaced above the disc 72 sufficiently to permit a single coin of the greatest thickness treated to slide edgewise beneath the flange. In the same horizontal plane and on its outer face the ring 75 is provided with a lateral annular flange 77 of the same thickness as flange 76 and which has its periphery coincident with the periphery of the disc 72, the face of which, underlying flange 77, is milled or otherwise roughened as shown at 78, see Figure 11.

A track ring 79 having on its bottom edge a lateral internal annular ledge 80 is fixedly supported by and between the standards 32 and 33 with the ledge 80 arranged in the plane of the disc 72 and spaced apart from the periphery of the disc to an extent which permits all but the largest diameter coins to drop readily through the space between the periphery of the disc and the track ring ledge. As the diameter of track ring 79 is greater than the distance separating standards 32 and 33, the ring is provided with depending internally extending sleeves or blocks engageable over the standards and secured thereon by set screws 81.

A second disc 82, identical with the disc 72, is attached to shaft 37 below the neck 53 of the second hopper 42, and is adjustably anchored by the set screw 83. This second disc, like disc 72, has a groove 84 receiving the bottom of a retaining ring 85 having an inner face flange 86 and an outer face flange 87, it being a counterpart of ring 75. Beneath the flange 87 the face of disc 82 is formed with a milled portion 88. Adjacent this disc a track ring 89, identical with track ring 79, is mounted, its ledge 90 being spaced from the edge of disc 82 to permit coins to drop therebetween. The track ring 89 has a diameter equal to that of track ring 79 and in a similar manner is supported on the standards 32 and 33 by set screws 91.

A third disc 92 is attached to shaft 37 by set screw 93, beneath the neck 54 of hopper 43. This disc is identical in construction to the discs 72 and 82, having a groove 94 receiving the bottom of a retaining ring 95 formed with inner and outer face flanges 96 and 97 spaced slightly above the disc face. It is also provided with a milled portion 98 and lies in the plane of the bottom of a third track ring 99 similar to track rings 79 and 89. Track ring 99 is formed with a ledge 100 spaced from the edge of disc 92 to permit passage of coins, and the ring is secured to the standards 32 and 33 by set screws 101.

The fourth and lowermost disc 102 of the series is identical in structure to the discs 72, 82 and 92, being attached to shaft 37 by the set screw 103 beneath neck 55 of hopper 44. It is provided with a groove 104 which receives a retaining ring 105 having an inner face flange 106 spaced above the face of the disc.

Figure 6:
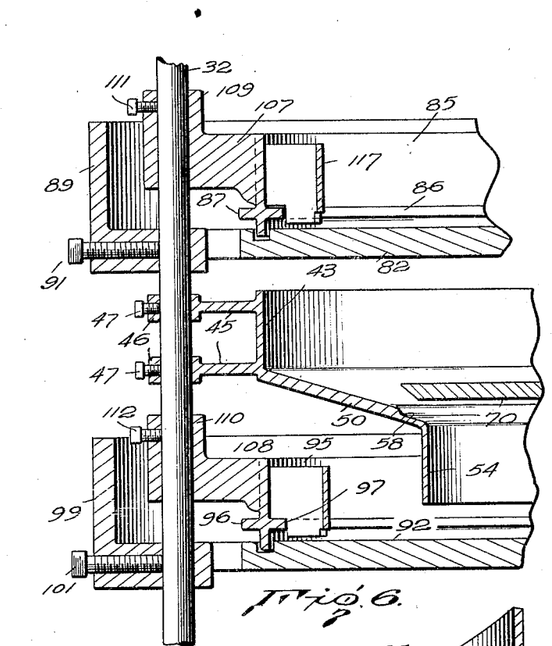

The respective coin retaining rings 75, 85, 95 and 105 are rigidly supported by and between the standards 32 and 33 in the manner detailed in Figure 6 in the instance of rings 85 and 95. As shown, the rings, adjacent the standards, are formed respectively with radial ears 107 and 108 terminating in sleeves 109 and 110 which engage over the standard being anchored thereto by the respective set screws 111 and 112 in such position that the bottoms of the rings clear the bottoms of the grooves in which the rings ride freely.

Figure 7:
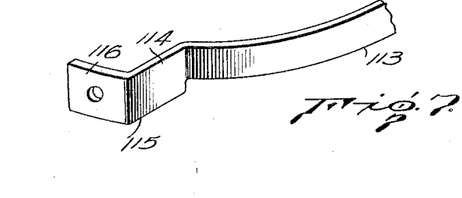
Figure 7 is a fragmentary perspective of a rake-off arm employed.

The uppermost coin retaining ring 75 is provided with a coin rake-off arm 113 curved in an arc, the chord of which is less than the diameter of its associated ring. This arm is rigidly secured at its ends to substantially diametrically opposed points on the inner face of coin ring 75, the height of the arm being less than that of the ring and the bottom edge of the rake-off arm being spaced above disc 72, occupying a horizontal plane common to the coin ring flanges 76 and 77. As best shown in Figure 7, one end of the rake-off arm 113 is formed with an outwardly bent portion 114 which has its bottom edge 115 extended toward disc 72 sufficiently to prevent the passage of a coin thereunder. The portion 114 provides an angled baffle which aids in directing coins from disc 72 as will be described. An attaching lip 116 is bent from the end of baffle 114, by which the end of the arm is secured to the face of the coin ring.

Figure 2:
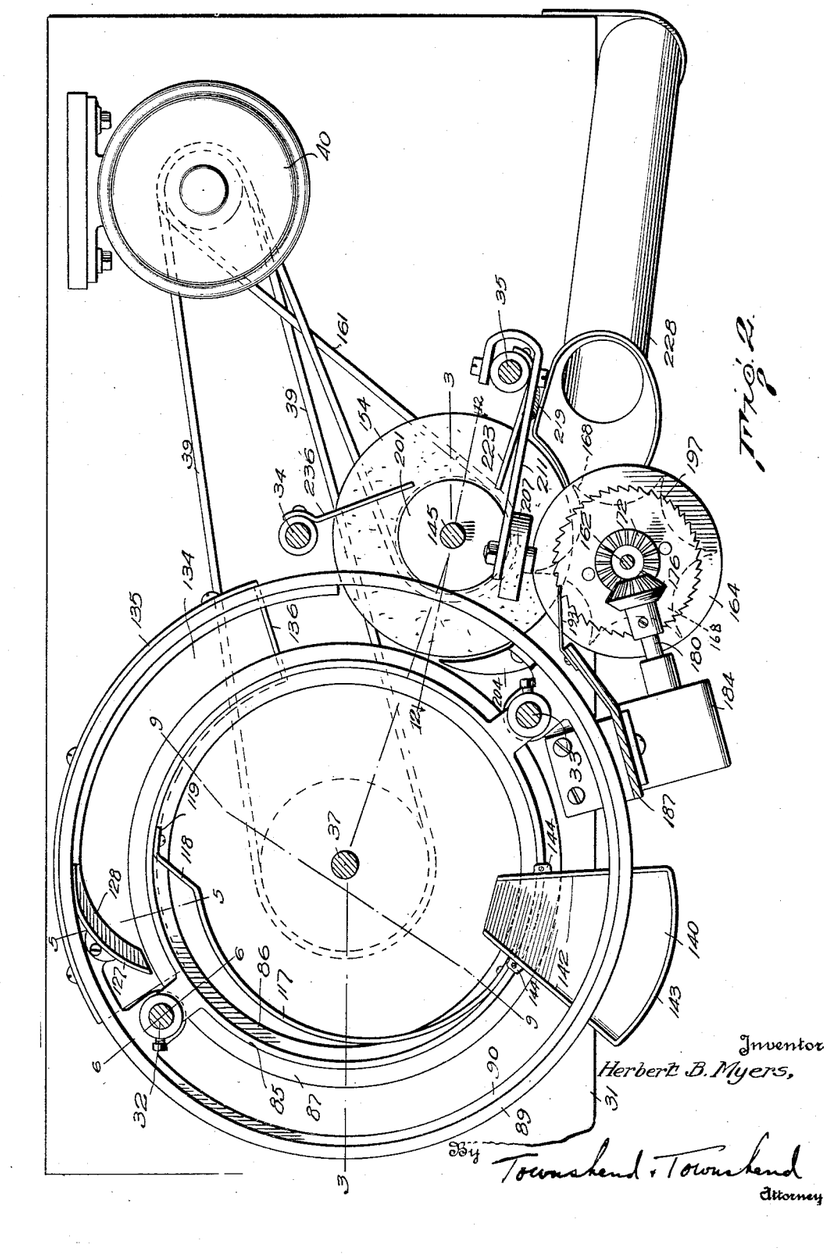
Figure 2 is a horizontal section therethrough, substantially on the line 2—2 of Figure 1.

In like manner the coin retaining ring 85 carries a rake-off arm 117 having a baffle 118 and attaching lip 119, see Figure 2, identical with arm 113 previously described. A similarly constructed rake-off arm 120, having a baffle 121 and attaching lip 122 is carried by the coin ring 95. All of the rake-off arms 113, 117 and 120 are identical in construction and arrangement, being disposed in vertical alignment.

Figures 4, 9, 10, 11:
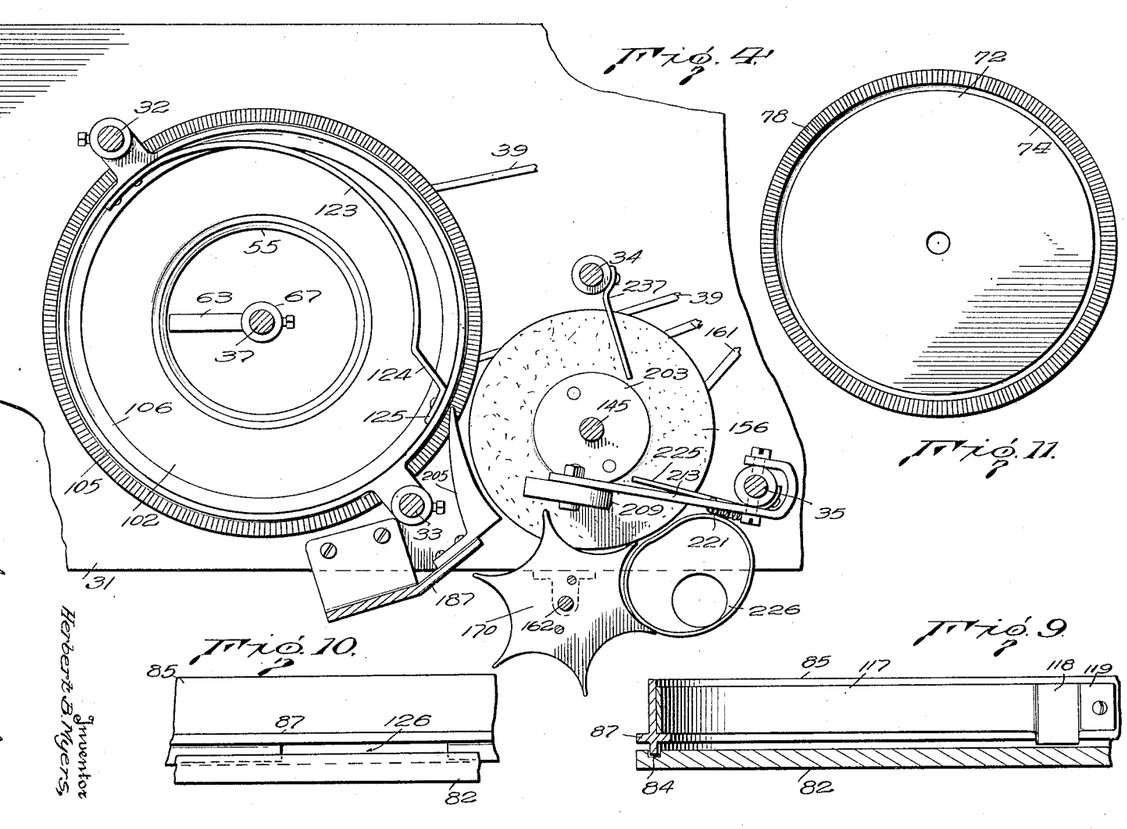
Figure 4 is a section substantially on line 4—4 of Figure 1.
Figure 9 is a fragmentary section substantially on line 9—9 of Figure 2.
Figure 10 is a fragmentary elevation of a portion of the machine externally opposite the coin discharge slot of a retaining ring.
Figure 11 is a top plan view of a coin discharge plate.

The lowermost coin retaining ring 105 carries a rake-off arm 123 having a baffle 124 and an attaching lip 125. This rake-off member is identical to the rake-off arms 113, 117 and 120 but is differently disposed, being arranged as illustrated in Figure 4. In this instance the rake-off arm has its baffle portion 124 disposed directly adjacent a part of the counter mechanism later to be described in detail.

Figure 8:
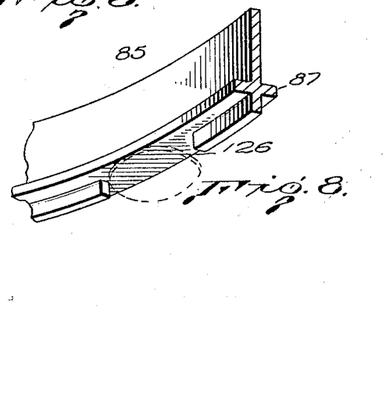
Figure 8 is a fragmentary perspective of a retaining ring slotted for coin discharge.

Each of the respective coin retaining rings 75, 85 and 95 is formed with a cut out portion or slot in its bottom edge of a size sufficient to permit coins to slide therethrough one by one. These coin discharge openings are in vertical alignment and are beneath the inner and outer face flanges of the respective rings. To avoid undue multiplicity of detail and owing to identity of construction, only the slotted construction of retaining ring 85 is shown in detail, being illustrated in Figures 8 and 10 wherein ring 85 beneath its flanges 86 and 87 is formed with a slot 126 through which coins slide singly over face of disc 82 into the trackway formed by the milled edge 88 of the disc and the ledge 90 of track ring 89.

Figure 5:
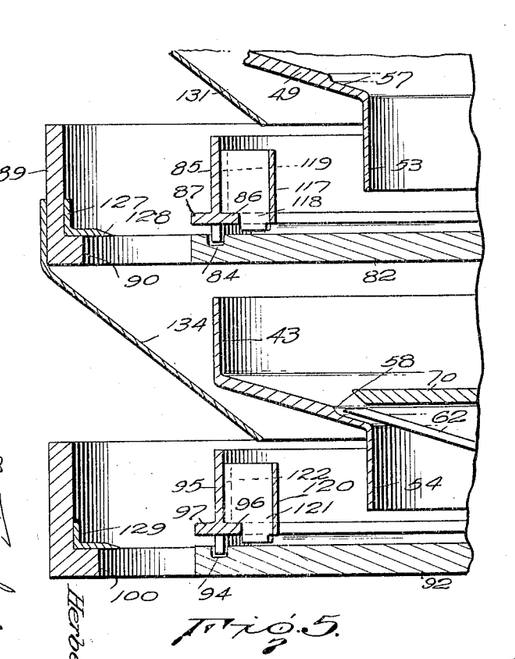
Figures 5 and 6 are fragmentary sections on the lines 5—5 and 6—6 respectively of Figure 2.

In order to guide coins which are discharged through the respective coin ring openings each of the track rings 79, 89 and 99 is provided with guide means, such as an angled deflector extending across the gap between the milled edge of the adjacent disc and the track ring ledge. One such an arrangement is illustrated in detail in Figure 2 wherein the track ring 89 has attached thereto a curved deflector plate 127 formed with a lateral tapered bottom ledge 128 which extends between the track ring ledge 90 and the edge of disc 82, seating on the ledge 90 to form, in effect, a continuation thereof. This deflector is mounted opposite the discharge opening through the coin retaining ring 85 and its inclined face substantially parallels the inclined baffle 118 of rake-off arm 117, the two elements cooperating in directing coins at opposite sides of the coin discharge opening of the ring 85. In Figure 5 there is also shown the deflector 129 carried by track ring 99.

Figures 12, 13, 14, 15, 16, 17:
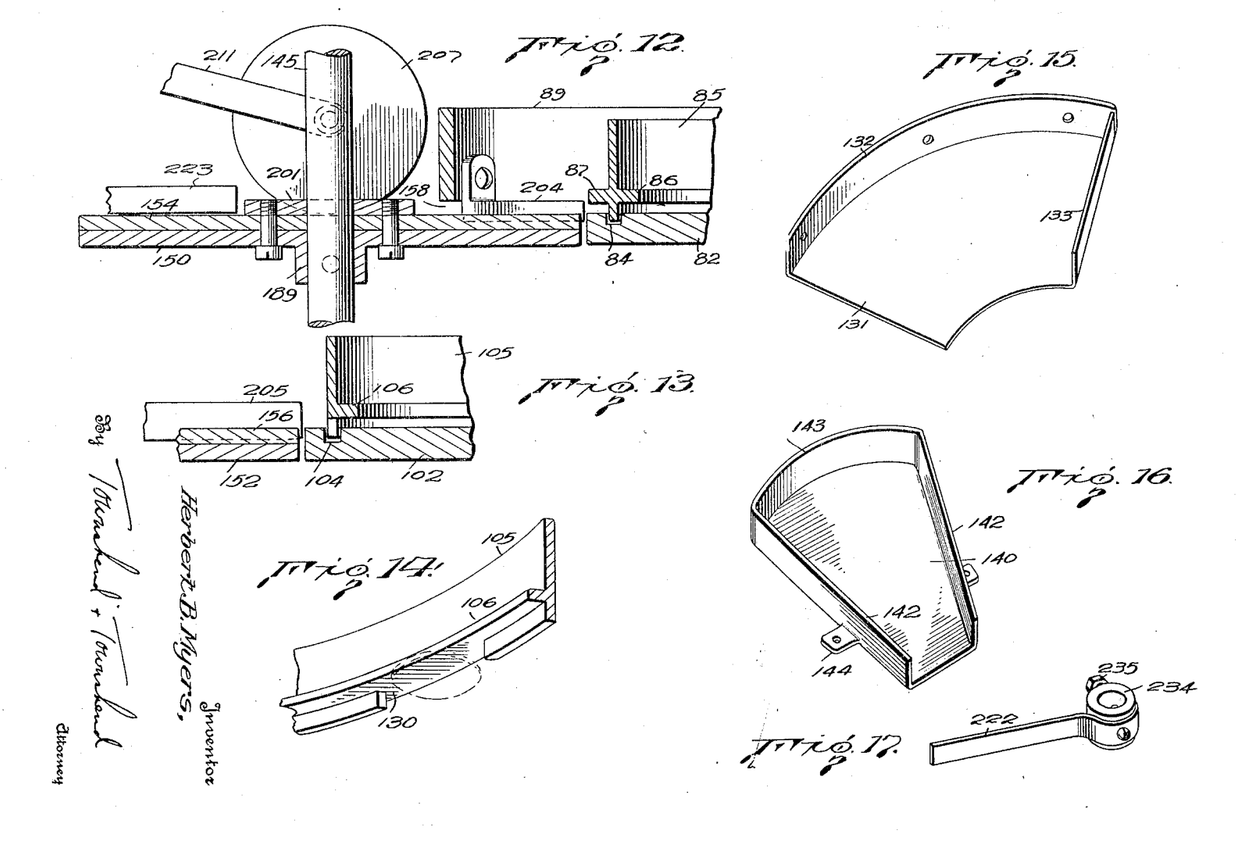
Figure 12 is a fragmentary section on the line 12—12 of Figure 2.
Figure 13 is a fragmentary section, substantially in the plane of line 12—12 but illustrating a detail of the lowermost coin discharge plate.
Figure 14 is a fragmentary perspective similar to Figure 8, but illustrating detail of the lowermost retaining ring.
Figure 15 is a perspective of a coin transfer chute.
Figure 16 is a perspective of a coin supply chute.
Figure 17 is a perspective of a counter-rake-off finger, as shown in Figure 4.

As the lowermost separating unit discharges directly onto its associated counter mechanism, no track ring or deflector plate is needed but the coin retaining ring 105, as shown in Figure 14, is formed with a coin discharge port 130 beneath the flange 106.

As mixed coins are discharged from the uppermost unit only the largest will be separated out and retained on its associated trackway, all coins of smaller size falling through the open track as they have not a diameter sufficient to bridge the gap. In order to transfer such dropping coins to the next lower separating unit a sector shaped transfer chute 131, shown in Figure 15, is provided. This chute has an inclined bottom which extends beneath hopper 42 inside the confines of coin retaining ring 85 to discharge onto disc 82. Chute 131 extends substantially about one quarter of the distance around the uppermost trackway beginning just in advance of the deflector member, and is rigidly mounted by securing elements anchored in the track ring 79 through an upstanding attaching flange 132 formed on the chute. The chute is also provided with an end flange 133 which prevents coins from sliding off the end of the chute.

In like manner the track ring 89 carries a transfer chute 134 secured thereto by its attaching flange 135, provided with an end flange 136 and leading to disc 92. Similarly, track ring 99 has attached thereto a transfer chute 137 provided with its end flange 138 and leading to the lowermost disc 102. Coin feed or supply chutes 139, 140 and 141 are carried by the respective hoppers 42, 43 and 44. These chutes are disposed opposite the previously described transfer chutes and are identical in construction and arrangement, one chute, 140, being shown in detail in Figures 2 and 16. As illustrated, the chute is segmental in form having a downwardly inclined bottom provided with upturned sides 142 and a back flange 143, the inner end of the chute being open. Ears 144 are formed on the sides of the chute whereby it may be rigidly attached to the rim of a coin hopper extending radially outward appreciably beyond the peripheral limits of the respective track rings.

The mechanism thus far described constitutes the coin assorting units of the apparatus which functions in conjunction with counting and distributing mechanism, now to be described in detail.

At one side of the superposed bank of assorting units a vertical driven shaft 145 is journalled between a lower bearing 146 on the base 31 and a top bearing 147 carried by a cross head 148 mounted on the upper ends of the standards 33, 34 and 35. Rigidly attached to this shaft and rotatable therewith are four counter discs 149, 150, 151 and 152 provided with friction facings 153, 154, 155 and 156 respectively. These counter discs are arranged respectively in the planes of the coin separator discs 72, 82, 92 and 102, and are arranged in such manner that their peripheries are just out of contact with the peripheries of the separator discs. In order to accommodate this disposition of the counter discs, the function of which is to carry coins off from the assorting mechanism trackways, and in order to permit passage thereunder of coins, the track rings 79, 89 and 99 have their respective track ledges and bottoms recessed as at 157, 158 and 159 respectively. The shaft 145 and its counter discs are rotated in a counter-clockwise direction through means of a pulley 160 having a belt drive connection 161 with a driving pulley on the shaft of motor 40.

Adjacent the shaft 145 and in parallel relation thereto, a shaft 162 is mounted between bearings in the base 31 and crosshead 148, which shaft has independently rotatably mounted thereon four guide discs 163, 164, 165 and 166 respectively which have attached to their under faces the star wheels 167, 168, 169 and 170. As best shown in Figures 2 and 4, these guide discs and star wheels extend over the adjacent edges of their respectively associated counter discs, with the fingers of the star wheels lying on the friction facings of the counter discs and with the guide discs spaced above the friction facings sufficiently to accommodate the thickness of coins engaged between the star wheel fingers.

Each guide disc has fixed thereto a bevelled gear 171, 172, 173 and 174 respectively, each in constant mesh with pinions 175, 176, 177 and 178 fixed to the respective operating shafts 179, 180, 181 and 182 of counters 183, 184, 185 and 186 secured to one wall of a vertical angle bracket 187 which is supported by attachment to the track rings. As the star wheels are free running on shaft 162, bearing on holding sleeves 188, 189, 190 and 191 attached to the shaft, one wall of bracket 187 has attached thereto at the proper intervals spring pawls 192, 193, 194 and 195 which respectively engage against toothed rack wheels 196, 197, 198 and 199 fixed respectively to the guide discs 163, 164, 165 and 166, thereby holding the star wheels and counters against actuation except when moved by the engagement of coins with the star wheel fingers.

In order to insure proper positioning of coins on the counter discs, each disc is provided above its respective friction facing, with a central circular track plate, 200, 201, 202 and 203 respectively, which track plates cooperate with guide fingers attached to the inner face of bracket 187 and extending around the edges of the counter discs 149, 150, 151 and 152 to the edge of the respectively adjacent coin discs 72, 82, 92 and 102. Two of these guide fingers, 204 and 205, are shown in detail in Figures 2 and 4. These guide fingers direct coins onto the facings of the counter wheels into contact with the respective counter disc track plates which guide the coins into engagement with the adjacent star wheel fingers.

As a means of causing a positive rotation of the star wheels by engaged coins, there is provided above each counter wheel a pressure roller to engage and press upon a coin during its engagement with the star wheel. The pressure rollers 206, 207, 208 and 209 are journalled in the inner ends of supporting arms 210, 211, 212 and 213 of strap metal and which have their outer ends bent in U shape around sleeves 214, 215, 216 and 217 rigidly secured to the standard 35 and capable of adjustment vertically thereon. The set screws which anchor the sleeves to the standard also serve as pivot bearings for the ends of the roller arms and the respective rollers are maintained under constant spring tension by means of contraction springs 218, 219, 220 and 221 connected between ears on the supporting arms and the set screws of respectively lower sleeves, as shown best in Figure 1.

Extending inwardly over the counter wheels substantially directly beneath the pressure roller supporting arms are rake-off fingers 222, 223, 224 and 225 which wipe off coins passed from the adjacent star wheels into the mouths of adjacent distributor tubes 226, 227, 228 and 229 which lead to coin receptacles 230, 231, 232 and 233 in which the assorted and counted coins are received. The mounting of these rake-off fingers is such that they are capable of adjustment vertically on the standard 35 through means of set screw anchored support sleeves. As shown in Figure 17, the rake-off finger 222 is attached to its support sleeve 234 which is secured to standard 35 by means of a set screw 235. The remaining rake-off fingers are identically constructed and mounted and it is obvious that by regulating the spacing of the rake-off fingers above the surfaces of the counter wheels, only coins of a standard thickness will be wiped off into the distributor tubes. Coins of less than the standard thickness will pass under the fingers and will be removed by a second set of rake-off fingers carried by standard 34, two of which, 236 and 237, are shown in Figures 2 and 4, into supplemental receptacles, not shown.

In the apparatus thus far described the four separating units are adapted respectively from top to bottom, for quarters, nickels, pennies and dimes. When a mixed lot of such coins is to be assorted and counted the entire batch is fed into the upper hopper 41 and motor 40 set in operation to cause a clockwise rotation of shaft 37 and its attached elements as described, and a counterclockwise rotation of shaft 145 and attached elements, through the driving connections as described. The rotation of spreader plate 68 will throw coins onto the inclined hopper bottom 48 from whence they will slide beneath a spreader 68 and drop through hopper neck 52, falling onto the flat rotating face of coin disc 72. Agitator arm 60 rotating through seat 56 prevents any jamming of coins between the spreader plate and hopper bottom.

Under the centrifugal force imparted to the coins by rotation of disc 72, the coins will travel to and around the periphery of the disc and will be caused to lie flat by contact with rake-off arm 113. In this movement of the coins, they will be retained on the disc by retaining ring 75, its inner flange 76 acting to allow only single coins to slide thereunder. As the disc rotates, those coins bearing edgewise against the ring beneath flange 76 pass beneath rake-off arm 113 until they contact the angled baffle 115 which directs them singly and successively through the ring discharge aperture into contact with the deflector on upper track ring 79. Due to the disposition of the bottom of retaining ring in the disc groove 84 there can be no possibility of coins leaving disc 72 except through the discharge port of ring 75.

As only the largest coins, the quarters, are of sufficient diameter to bridge the gap between track ring ledge 80 and the milled portion 78 of the coin disc, the quarters will be slid along the trackway thus formed, due to the friction of the milled disc edge 78. In this movement of the coins the outer flange 77 of ring 75 engages over the coins to retain them flat on the trackway and prevent any possibility of tilting such as would cause them to drop through the track.

As the coins riding along the trackway come adjacent the track ring slot 157 they will ride upon the friction facing 153 of counter disc 149 upon which they will be retained in bearing against the guide plate 200 and leave the trackway. As the coins are carried by rotation of the counter disc beneath pressure roller 206 they will be held firmly and will at the same time engage a finger of the star wheel 167 to rotate the star wheel and actuate the register 183 through the connections and mechanism previously detailed. After passing the star wheel the coins are engaged by rake-off finger 222 which slides the coins into the mouth of distributor tube 229.

All coins of smaller diameter upon passing through the discharge port of ring 75 will fall through the open trackway onto transfer chute 131 which delivers them to the central portion of the next lower coin disc 82. On this disc the coins are flattened out by rake-off arm 117 under which they slide to abut the baffle 118 and be projected through discharge port 126 of retaining ring 85 against deflector 127 from which the coins of largest diameter, the nickels, are carried around the trackway formed by ledge 90 of track ring 89 and the milled portion 88 of coin disc 82.

This operation is shown best in Figure 2. When the coins reach the end of the trackway they are received on counter disc face 154, the rotation of which carries the coins into engagement with the guide baffle 204 and as this element is curved, the coins are held engaged against the guide plate 201 being carried by the counter disc beneath pressure roller 207 into engagement with a finger of star wheel 168 and thereby actuating register 184. On contact with arm 223 the coins are removed from the counter wheel into the distributor tube 228.

Following their discharge from the port 126 of the retaining ring 85, the smaller coins consisting of pennies and dimes will drop through the open track to transfer chute 134 which delivers them onto the next lower disc 92. In this third lower unit the pennies are separated out, counted and distributed and the dimes drop to transfer chute 137 which delivers them to the lowest disc 102. As there is no separation required in this unit, see Figure 4, the coins discharge through the port of retaining ring 105 directly onto the facing 156 of counter disc 152 upon which they are counted and from which they are removed to distributor tube 226, by means and mechanism previously described, and operating in the same manner as the means and mechanism detailed in the description of operation of the upper units.

If it is desired to use the apparatus only to count batches of previously assorted coins, the batches of the various denominations are fed directly to the hoppers of their respective units, using the feed chutes 139, 140 and 141. The upper hopper 41 being clear needs no feed chute. The machine is then operated in the manner previously described, and the coins from each unit will be counted and distributed.

If, after counting, it is desired to separate the coins with respect to a standard of thickness, the rake-off fingers 222, 223, 224 and 225 are adjusted on standard 35 so that they are spaced sufficiently above the counter discs to allow thin coins to pass beneath, and at the same time to engage and wipe off coins of a standard thickness.

The high degree of adjustability of the various elements of the apparatus makes it unusually efficient and adaptable to different sizes and shapes of objects to be assorted and counted.

In Figures 18 to 24 inclusive there is shown an embodiment of the invention intended for coin assorting use only. In this embodiment a pair of inverted U-shaped side brackets 238 having outturned base attaching feet 239 are arranged upon a suitable horizontal base. Each bracket is provided at its bend with a bolt hole in alignment with a bolt hole in the adjacent end of a flat supporting bar 240 disposed transversely between the brackets with its ends resting thereon. Vertical parallel standards 241 are supported at their lower ends by the brackets 238, the lower ends of the standards being formed with externally threaded reduced bolt stem portions 242 which are passed through the bolt holes in the supporting bar ends and the brackets. Nuts 243 threaded over these bolt portions serve to anchor the standards, clamping the bracket and supporting bar ends against the shoulders formed on the standards by the provision of the reduced ends 242.

Attached to the upper ends of standards 241 and extending therebetween in parallel relation to the lower supporting bar 240, is an upper flat supporting bar 244 which carries a depending hopper 245 having an inclined bottom 246 and a cylindrical discharge neck 247. A vertical shaft 248 journalled in bearings formed at the center of the supporting bars 240 and 244 passes through the hopper and carries a circular distributor plate 249 which is held in a desired position on the shaft by means of the set screw 250. This plate 249 is positioned above the adjacent edge of the hopper bottom in order to permit coins to slide therebetween, and adjacent the neck 247 the hopper bottom is rabbetted to form an annular seat 251 in which travels the upper end of an inclined agitator arm 252 carried by a sleeve 253 adjustably secured to the shaft by a set screw 254.

Rigidly attached to the lower end portion of the shaft by a set screw 255 is a coin disc 256 spaced beneath the hopper neck 247 and having formed in its upper face a continuous annular groove 257 spaced inwardly of the periphery, and having that portion lying between the groove and the periphery formed as a milled surface 258.

Figure 18:
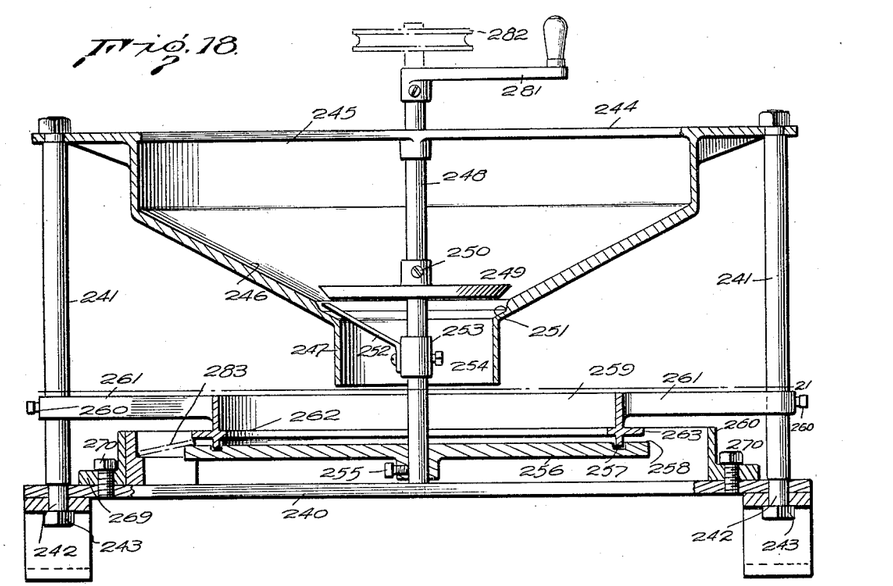
Figure 18 is substantially a central vertical section through a coin sorting embodiment of the invention.
Figures 19, 20:
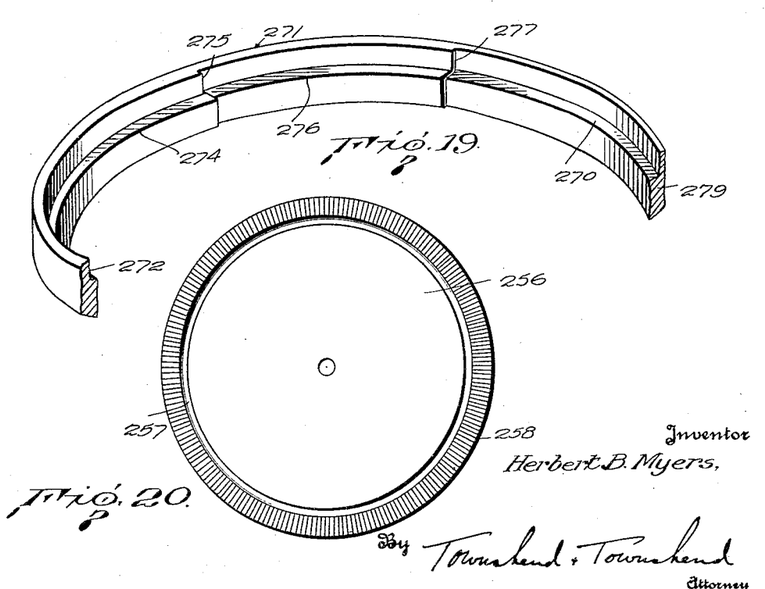
Figure 19 is a fragmentary perspective of a separating ring used therewith.
Figure 20 is a top plan view of a coin discharge plate.
Figure 21:
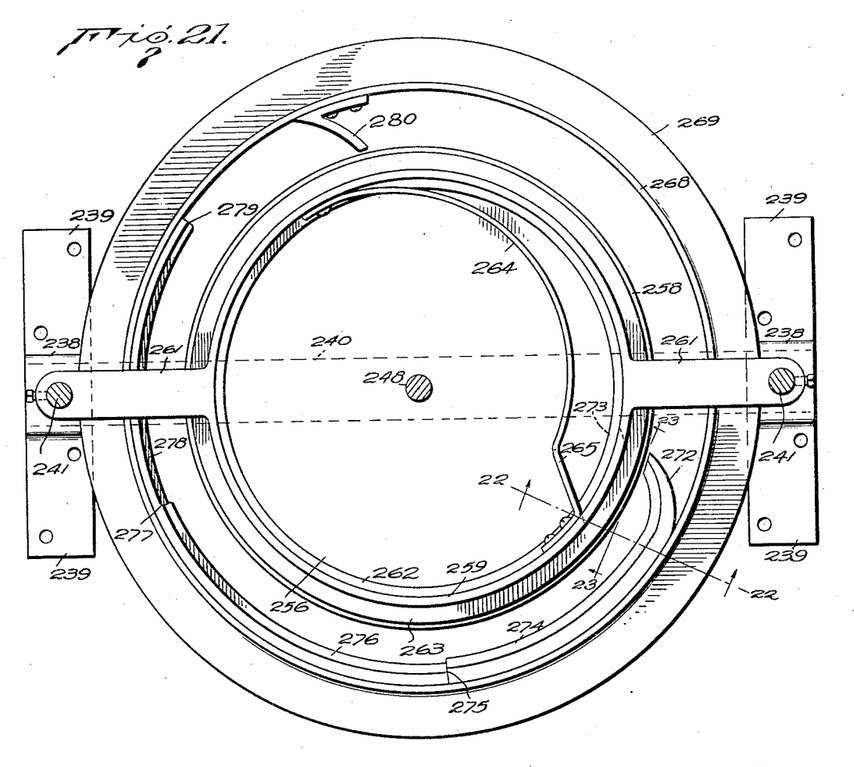
Figure 21 is a section on the line 21—21 of Figure 18.
Figure 22:
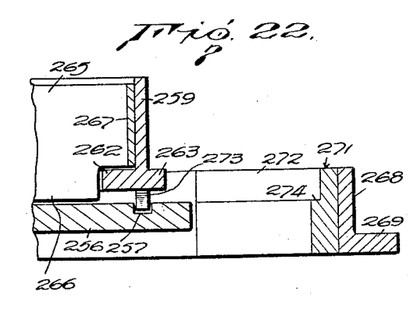
Figure 22 is a section on line 22—22 of Figure 21.
Figure 23:
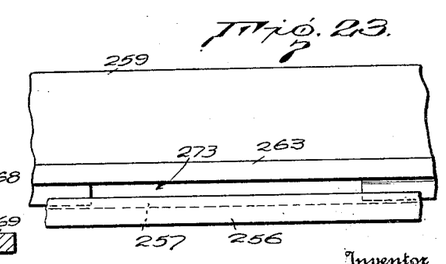
Figure 23 is a fragmentary elevation along line 23—23 of Figure 21.
Figure 24:
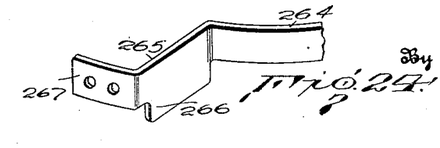
Figure 24 is a fragmentary perspective of a coin rake-off element.

A coin retaining ring 259 having its bottom disposed in the groove of the coin disc is vertically adjustable on the standards 241 by set screws 260 in the ends of diametrically opposed bracket arms 261 integral with the ring and which are apertured at their outer ends for sliding engagement over the supporting standards. Above its bottom the ring 259 has formed thereon an inner annular flange 262 and an outer annular flange 263, both being disposed in a common horizontal plane. As shown in Figure 18, the outer flange 263 is of greater width than the inner flange, and it extends nearly to the periphery of the coin disc. The ring 259 is so positioned with respect to the coin disc that the flanges 262 and 263 are spaced above the face of the disc sufficiently to allow coins to slide edgewise under the flanges.

The coin retaining ring is provided with a coin rake-off arm 264 of arcuate configuration, having its major portion formed in an arc, of which the chord is less than the diameter of the retaining ring. One end of this arm is secured to the inner face of ring 259 and the arm extends across the face of the coin disc with its bottom edge disposed in the plane of the retaining ring flanges. At the end of its arcuate portion the arm is bent outward at an obtuse angle to form an inclined portion 265 the bottom of which extends down to the face of the coin disc, forming a deflector 266. At the edge of the portion 265 the body of the arm is bent to provide an attaching lip 267 by which it is secured to the adjacent inner face of the retaining ring.

Surrounding the coin disc 256 and in concentric spaced relation therefrom is an annular track support 268 formed with a lateral base ledge 269 attached by securing elements 270 to the lower supporting bar 240.

A substantially semi-circular coin track member 271 is secured to the inner wall of the track support, one end thereof being inwardly directed at an angle to the periphery of the coin disc, to form a coin guide 272. This guide is disposed opposite a coin discharge recess 273 formed in the bottom of the coin retaining ring 259 adjacent the rake-off arm deflector 226.

The coin track member 271 throughout substantially a third of its length, beginning at the guide 272, is provided with an inwardly extending track ledge 274 the top of which is substantially flush with the top face of coin disc 256. The track ledge 274 terminates in a shoulder 275 from which point a track ledge 276 continues, its top face being disposed in a lower plane than that occupied by the top of ledge 274, and the inner walls of the ledge and the track member above the ledge are set back with respect to that portion which carries track ledge 274. In like manner track ledge 276 terminates in a shoulder 277 from which point a third track ledge 278 continues to the end 279 of the track member. The top face of ledge 278 is disposed in a lower plane than that occupied by the top of ledge 276, and the inner walls of the ledge and the track member above the ledge are set back with respect to that portion which carries track ledge 276. Beyond the end 279 of the track member a stop 280, attached to track support 268 extends between the inner face of the track support and the edge of coin disc 256.

An operating handle 281 is secured to the shaft 248 at the upper end thereof and the shaft may further be provided with a pulley 282 for motor drive if desired. In the operation of this apparatus a mixed batch of coins, one of which is indicated at 283 in Figure 18, is deposited in the hopper and the shaft rotated in a clockwise direction. The coins will be dispersed by centrifugal action of the spreader plate 249 to lie flat on the inclined hopper bottom, from which they slide beneath the spreader plate and drop through the hopper neck onto the rotating coin disc 256. Agitator arm 252 travelling through its seat 251 prevents any jamming of the coins, and adjustment of the spreader plate determines the rate of feed to the coin disc.

Coins dropped on disc 256 are thrown toward its periphery by centrifugal force and are flattened by contact with rake-off arm 264 under which they slide as well as under the retaining ring flange 262, to bear against the retaining ring 259. The bottom edge of the rake-off arm and flange 262 serve to prevent piling and sticking of the coins, while the disposition of the retaining ring bottom in the disc groove 257 prohibits any escape of coins from the disc except singly through the ring discharge port 273.

As the coins are carried around by the disc they contact the angled deflector 266 and are projected through discharge port 273 to guide member 272 and thus onto track ledge 274. At this point the coins of smallest diameter, the dimes, being too small to bridge the gap between ledge 274 and the periphery of the coin disc, will drop through the open track into suitable receptacle means, not shown.

All coins of larger diameter will ride along track ledge 274, resting at one side on the track ledge and at the other side on the milled portion 258 of the coin disc beneath the outer retaining ring flange 263 which prevents accidental tipping of the coins which would permit dropping through the open track. The frictional contact with the milled portion of the coin disc carries the coins successively along the track and onto track ledge 276. At this point the ledge is below the face of the coin disc so that coins will assume a tilted position in travel, those of next smaller diameter, such as pennies, dropping through the open track while the nickels and quarters are carried along to track ledge 278 where the nickels being of lesser diameter than the quarters will in turn drop through the track, the quarters being carried along to drop past the end 279 of the track member.

As the space between the periphery of the coin disc and the wall of the track support 268 is greater than the diameter of the quarters, these coins on leaving the track member will drop into their receptacle means, not shown.

An embodiment of the invention in which the mechanism functions as a counting machine is shown in Figures 25 to 30 inclusive. In this form a base 284 carries a pair of spaced, parallel upright standards 285 to the upper ends of which is secured a supporting bar 286 extending transversely therebetween and provided at its center with a bearing for the upper end of a vertical shaft 287, the lower end of which is supported in a bearing provided in the base.

The bar 286 forms the support for a depending hopper 288 having an inclined bottom 289 and a discharge neck 290 surrounding the shaft. An agitator arm 291 carried by a set screw adjustable sleeve 292 on the shaft is arranged with its free end disposed for travel through an annular seat 293 formed in the hopper bottom at the top of neck 290. A circular distributor plate 294, rotatable with the shaft and vertically adjustable thereon by means of the set screw 295 is spaced sufficiently above the hopper bottom to permit coins to slide edgewise beneath the plate.

Beneath the hopper neck shaft 287 has fixed thereto a coin disc 296, vertically adjustable on the shaft by means of a set screw 297. The disc is provided with an annular friction material facing 298 extending from its periphery inward, the inner edge of the facing being bounded by a continuous annular groove 299 formed in the disc, which groove receives the bottom of a coin retaining ring 300 provided with a laterally extending annular inner face flange 301 and an oppositely directed outer annular flange 302 arranged in a common horizontal plane spaced sufficiently above the disc 296 to permit single coins to slide edgewise beneath the flanges.

A track ring 303 surrounds the coin disc, being supported between the standards 285 by means of set screws 304 positioned in lugs 305 made integral with the track ring and apertured for sliding engagement over the standards. At its bottom the track ring carries an internal annular track ledge 306 flush with the top face of the coin disc and in slightly spaced concentric relation thereto. A plurality of radially arranged brackets 307 interconnect the walls of track ring 303 and coin retaining ring 300, whereby through the medium of the brackets the track ring supports the coin retaining ring in rigid association therewith.

The coin retaining ring 300 has attached thereto a coin rake-off arm 308 having the major portion of its body curved in an arc of which the chord is less than the diameter of the retaining ring. At one end of its arcuate body the rake-off arm is outwardly directed at an obtuse angle to form an inclined baffle 309 which terminates in an attaching lip 310 by which the end of the rake-off arm is secured to the retaining ring. The bottom edge of the rake-off arm lies in the plane of the retaining ring flanges 301 and 302, except at the baffle 309 wherein it is dropped to abut the surface of the coin disc to provide a deflector adjacent a bottom edge slot 311 formed in ring 300 to permit discharge of coins therethrough from the coin disc.

Beyond the discharge aperture the retaining ring 300 has rigidly attached thereto the lower end of a vertical bracket 312 provided with a pair of laterally extending arms 313 and 314 projecting in parallel spaced relation radially outwardly of the retaining ring. The lower arm, 314, is approximately twice the length of the upper and beyond the end of the upper arm it extends as an angled portion 315, the outer end of which is formed as a bearing 316 for the upper end of a vertical shaft 317 having its lower end journalled in a bracket arm 318 carried by the track ring 303.

Rotatable with the shaft 317 and secured thereto for vertical adjustment by means of a set screw 319, is a ratchet wheel 320, the teeth of which are engaged by a spring strip pawl 321 attached to the inner wall of the track ring, in such manner as to prohibit clockwise and accidental movement of the wheel. Beneath the ratchet wheel 320 and rigidly secured thereto is a guard disc 321 to the under face of which is attached a star wheel 322 in which the extremities of the fingers coincide with the periphery of the guide disc. The thickness of the star wheel 322 is no less than the standard of thickness for the bulkiest of coins to be counted, and both the star wheel fingers and guide disc extend inwardly over the surface of the friction facing strip 298 carried by the coin disc.

The wall of the track ring 303 is cut away to provide for proper clearance of the star wheel assembly, forming ends 323 and 324. The end 324 is spaced sufficiently from the star wheel to allow for disposition therebetween of the mouth 325 of a coin distributor tube 326 into which coins of a standard thickness are raked off by a wiping finger 327 carried by the track ring adjacent its end 324 and extending across the disc facing portion 298. The wiping finger is elevated sufficiently to permit passage thereunder of coins of less than a standard of thickness, the finger being vertically adjustable on the track ring to determine the standard. Coins passed beneath finger 327 are removed through a slot 328 in the track ring wall by means of a second wiping finger 329 carried by the track ring and abutting facing strip 298 of the coin disc. Coins discharged through slot 328 are received in the mouth 330 of a distributor tube 331, which with tube 326, leads to coin receptacle means, not shown.

Figures 25, 27, 28:
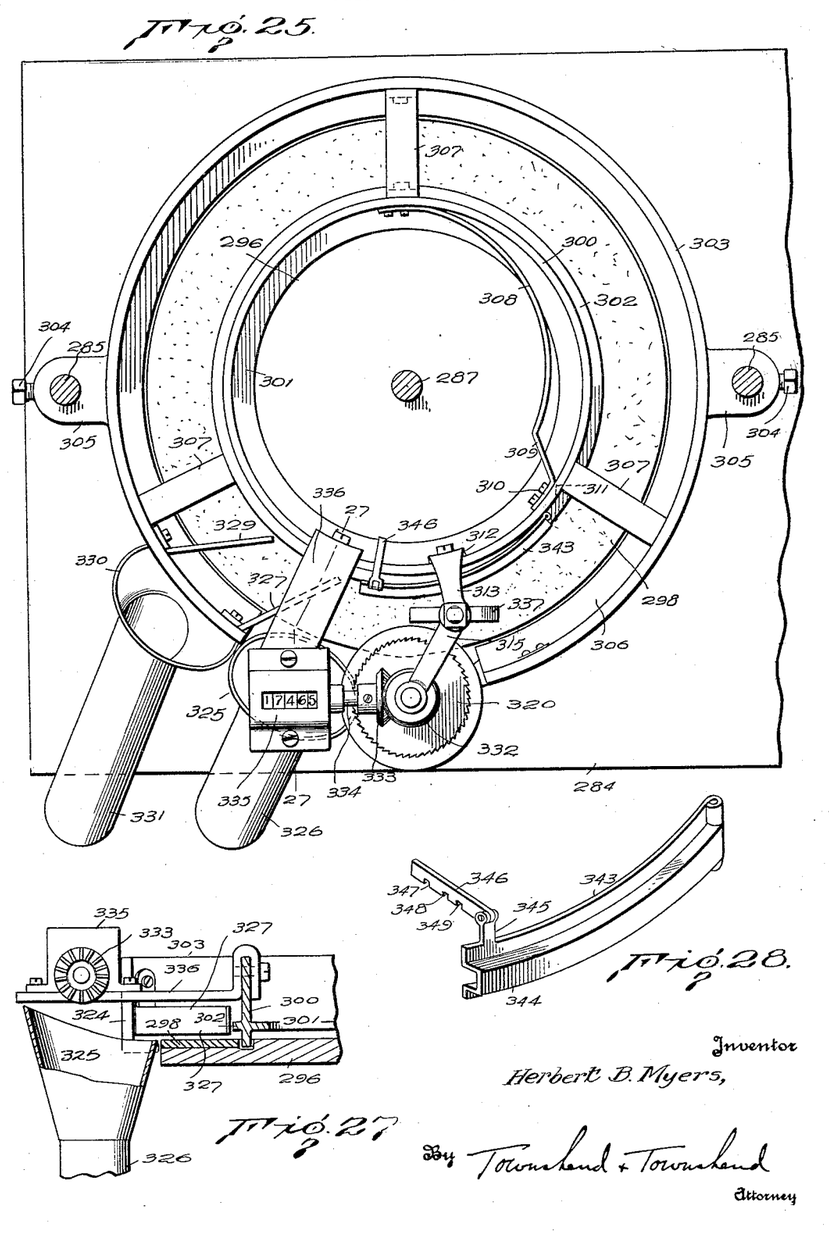
Figure 25 is substantially a horizontal section through a coin counting embodiment of the invention.
Figure 27 is a fragmentary section on line 27—27 of Figure 25.
Figure 28 is a perspective of an adapter member.
Figure 26:
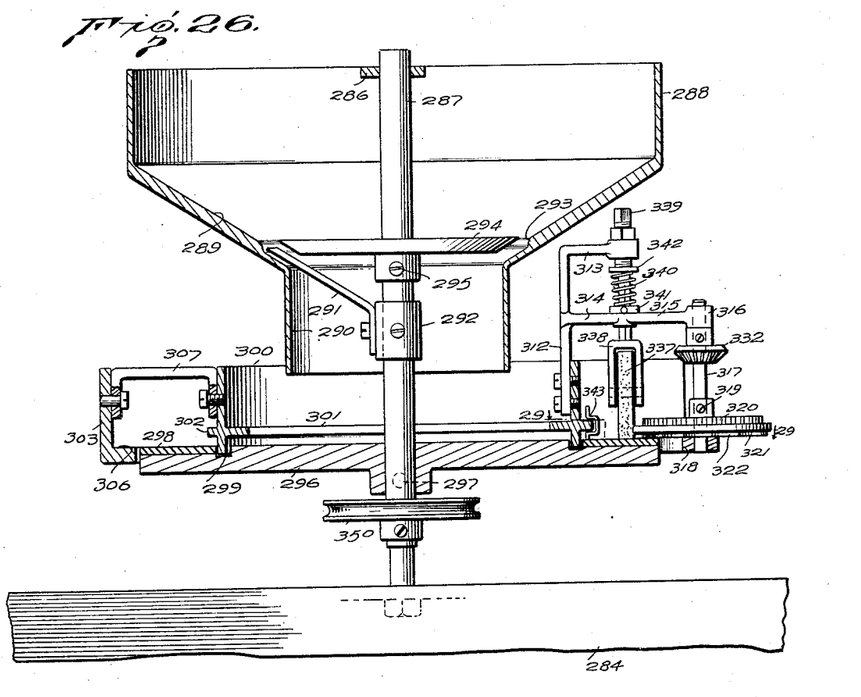
Figure 26 is substantially a central vertical section therethrough.
Figure 29:
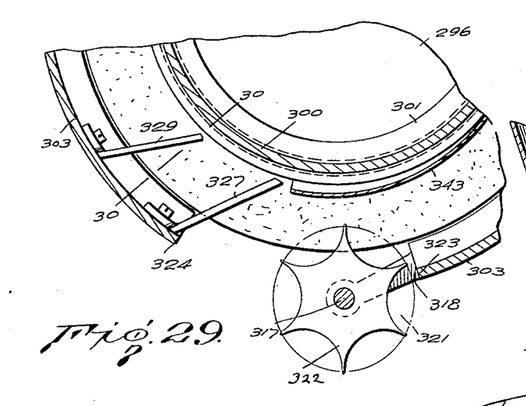
Figure 29 is a horizontal section on line 29—29 of Figure 26.
Figure 30:
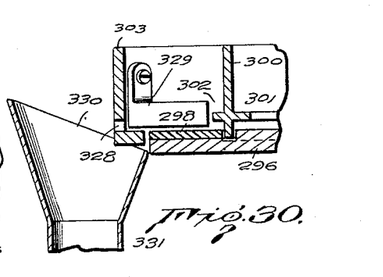
Figure 30 is a section on line 30—30 of Figure 29.

The shaft 317 has rigidly attached thereto a bevel gear 332 in constant mesh with a pinion 333 on the end of the operating shaft 334 of a register 335 supported on a bracket arm 336, the inner end of which is secured to the coin retaining ring 300 as shown in Figure 27. Adjacent the star wheel assembly there is positioned a presser roller 337 journalled in a fork 338 on the lower end of a vertically movable stem 339 guided through vertically aligned bearings in the bracket arm 313 and 314. A coiled expansion spring 340 surrounding the stem between a fixed abutment 341 on the stem and a tension adjusting member 342 threaded over the upper portion of the stem maintains a constant downward spring pressure on the roller 337.

In order to accommodate the mechanism to the counting of coins having different diameters, the retaining ring 300 has hingedly connected to its outer face an arcuate shoe 343 formed with a channel 344 to engage over the outer ring flange 302. This shoe is hinged at one end to the retaining ring and carries at its opposite end an upstanding ear 345 to which is hinged a rack arm 346 provided with under-cut sockets 347, 348 and 349 which are adapted to be engaged over the upper edge of the coin retaining ring in the various positions assumed by the rack arm. As the shoe is disposed substantially opposite the star wheel assembly, it is obvious that by proper adjustment of the rack bar 346 with respect to the upper edge of the retaining ring 300, the shoe may be moved across the face of the friction facing portion 298 of the coin disc to cooperate in providing a guide for directing coins into engagement with the fingers of the star wheel.

In the operation of this apparatus, assuming that coins of a relatively large diameter are to be counted, the rack bar 346 is positioned with its recess 349 engaged over the top of the retaining ring so that guide shoe 343 is housed against the outer face of the coin retaining ring. The shaft 287 carries a drive pulley 350 which has driving connection with a suitable power source, not shown. The shaft with its associated elements is set into rotation and a batch of coins is delivered to the hopper 288. The centrifugal action of the spreader plate 294 spreads coins flatly onto the inclined hopper bottom from whence they drop through the hopper neck 290 onto the rotating disc 296. The agitator arm 291 travelling in its seat 293 prevents any jamming of coins between the hopper bottom and the spreader plate 294.

As coins are delivered to the coin disc 296, they will be directed by centrifugal force towards the periphery of the disc. In their travel they are engaged by the inner ring flange 301 and by the rake-off arm 308 by which means they are flattened out on the face of the disc and caused to slide radially outward to engage edgewise under the flange 301. The disposition of the bottom of the retaining ring in the groove 299 of the disc prevents any possibility of coins being discharged from the disc at any point except through the discharge port 311 in the coin retaining ring.

As the coins are carried around beneath the ring flange 301 they will successively slide off beneath the rake-off arm 308 and upon engaging the deflector baffle 309 they will be projected through the ring discharge port 311 onto the friction facing strip portion 298 of the coin disc supported partially on this portion and partially upon the track ledge 306 of the track ring 303. The friction facing of the coin disc carries the coins successively beneath presser rollers 337 at which point they are held in firm engagement with the coin disc so that as the coins engage the fingers of the star wheel 322 beneath the guide disc 321 there will be a positive actuation of the star wheel in a counter-clockwise direction which will in turn through the mechanism previously described actuate the operating shaft of the register 335 effecting a count of the coins passing through the machine.

As the coins leave the star wheel they are passed into engagement with wiping finger 327 which has been set to wipe off coins of a standard thickness. Such coins will be wiped off into the mouth 325 of distributor tube 326. Coins of lesser thickness will be carried beneath wipe-off finger 327 into engagement with the wiping finger 329 which discharges the thinner coins through the track ring slot 328 into the mouth 330 of the distributor tube 331.

When coins of smaller diameter are to be passed through the machine the rack bar 346 of the pivoted guide shoe 343 is adjusted to dispose the guide in proper position to insure that coins carried along on the friction facing 298 and the track ledge 306 will pass into direct engagement with the star wheel fingers.

I claim:

1. Coin handling apparatus comprising a flat rotatable disc, means for rotating said disc, means for delivering coins to said disc, a stationary support, a retaining ring secured thereto and disposed over said disc in concentric relation thereto, said disc being formed with an annular groove receiving the bottom of said ring, said ring having a coin discharge port provided in its bottom portion, means on said ring for directing coins through said port, and means for adjusting the position of said ring axially of said disc.

2. Coin handling apparatus comprising in combination, a coin delivering unit including an open track, means for moving coins of a certain denomination along said track, coin counting mechanism adjacent said track, said counting mechanism including a rotary disc having a portion extending across said track to remove coins therefrom, and means for rotating said disc.

3. In a coin handling apparatus, a flat rotatable disc, means for rotating said disc, means for delivering coins to a face of said disc for discharge therefrom by centrifugal force, said disc having an annular groove in its coin receiving face adjacent its periphery, a retaining ring having its bottom edge disposed in said groove whereby to retain coins on said disc, said ring having a coin discharge port formed in its bottom, an arcuate rake-off arm carried by said ring and extending across said disc in spaced relation above the face thereof, an inclined deflector on said arm adjacent said coin discharge port and substantially contacting the face of said disc to direct coins through said discharge port, and a flange on said retaining ring and extending laterally therefrom in spaced relation above the disc face.

4. In a coin handling apparatus, a base, vertical upright standards secured thereto in parallel spaced relation, a cross-bar connecting the upper ends of said standards, a vertical rotatable shaft journalled in said base and cross-bar, a series of horizontal, vertically spaced flat discs rigidly attached to said shaft, a series of coin hoppers supported by said standards above the respective shaft discs, a coin retaining ring supported by said standards adjacent the upper face of each disc and having a coin discharge port therein, means on each retaining ring for directing coins through the discharge port, a track ring carried by said standards in concentric spaced relation to each of said discs, means on said discs for moving coins along said track rings after discharge through said coin discharge ports, and means for removing coins from said track rings.

5. Coin handling apparatus comprising a shaft, a set screw adjustable sleeve attached thereto, a star wheel rotatably carried by said shaft and bearing on said sleeve, a guard secured to said star wheel and extending over the fingers thereof, a gear wheel attached to said guard and star wheel, register means in operative connection with said gear wheel, a second shaft in parallel spaced relation to said first named shaft, means for rotating said second shaft, a coin carrying disc rigidly attached to said second shaft and extending beneath the fingers of said star wheel, means for delivering coins to said carrying disc in advance of the star wheel, means for pressing coins to the face of the carrying disc adjacent the star wheel, and means for removing coins from said carrying disc beyond the star wheel.

6. In a coin handling apparatus, an open coin track having a fixed rail and a movable rail, power means for operating said movable rail, means for delivering coins to said track to bridge said rails and be carried therealong by said movable rail, one of said rails having an open section, and conveyor means operable through said open section for removing coins from the track.

7. In a coin handling apparatus, an open coin track having a fixed rail and a movable rail disposed in a common horizontal plane, means for delivering coins horizontally to said track to lie across said rails whereby to be moved along the track by frictional engagement with said movable rail, means for moving said movable rail, said fixed rail having a portion removed, and a coin engaging conveyor operable through the opening in the fixed rail for removing coins from said track.

8. Coin handling apparatus comprising the combination with a flat rotary disc adapted to discharge coins therefrom by centrifugal force, of a fixed track member adjacent said disc and spaced therefrom to form with said disc an open coin track for coins discharged from said disc, mechanically operated means for removing coins from said track, and said disc having a milled area at its periphery forming a positive means for moving coins along the track.

9. Coin handling apparatus comprising a rotatable disc, means for rotating the disc, a support, an annular retaining wall attached to the support over said disc in concentric relation thereto, and having a coin discharge port formed in its bottom, and said disc having a groove receiving the bottom portion of said wall.

10. Coin handling apparatus comprising a rotatable disc, means for rotating the disc, a support, an annular retaining wall attached to the support over said disc in concentric relation thereto and having a coin discharge port in its bottom, a flange extending laterally from said wall over said disc between the top and bottom of said wall, and said disc having a groove receiving a portion of said wall below the flange.

11. In a coin handling apparatus, a rotary disc adapted to discharge coins therefrom by centrifugal force, a retaining ring concentric with and peripherally spaced from said disc to limit radial movement of coins discharged from said disc, a track ledge on said ring and cooperating with the disc edge to provide an open coin track whereby coins are moved therealong by frictional engagement with the disc edge, means for delivering coins to said disc, and coin counting mechanism including a rotary coin carrier member forming a part of the coin track.

In testimony whereof I affix my signature.

HERBERT B. MYERS.